United States Patent [19]

Meek et al.

[11] Patent Number: 4,529,857
[45] Date of Patent: Jul. 16, 1985

[54] CERAMIC-GLASS-CERAMIC SEAL BY MICROWAVE HEATING

[75] Inventors: Thomas T. Meek, Los Alamos; Rodger D. Blake, Santa Fe, both of N. Mex.

[73] Assignee: The United States of America as represented by the United States Department of Energy, Washington, D.C.

[21] Appl. No.: 538,890

[22] Filed: Oct. 4, 1983

[51] Int. Cl.$^3$ ............................................. H05B 6/64
[52] U.S. Cl. ..................... 219/10.55 M; 219/10.55 R; 156/272.2; 264/26
[58] Field of Search ................. 219/10.55 M, 10.55 R, 219/10.55 A, 10.55 F, 10.55 E; 264/26, 25, 27; 425/174.8 R, 174.8 E, 174; 156/272.2

[56] References Cited

U.S. PATENT DOCUMENTS

| | | | |
|---|---|---|---|
| 3,732,048 | 5/1973 | Guerga et al. | 264/25 X |
| 3,953,703 | 4/1976 | Hurwitt | 219/10.55 M |
| 4,003,368 | 1/1977 | Maxel | 219/10.55 E |
| 4,147,911 | 4/1979 | Nishitani | 219/10.55 M |
| 4,179,596 | 12/1979 | Bjork | 219/10.55 M |

Primary Examiner—Philip H. Leung
Attorney, Agent, or Firm—Leonard C. Brenner; Paul D. Gaetjens; Judson R. Hightower

[57] ABSTRACT

A method for producing a ceramic-glass-ceramic seal by microwaving, mixes a slurry of glass sealing material and coupling agent and applies same to ceramic workpieces. The slurry and workpieces are placed together, insulated and then microwaved at a power, time and frequency sufficient to cause a liquid phase reaction in the slurry. The reaction of the glass sealing material forms a chemically different seal than that which would be formed by conventional heating because it is formed by a diffusion rather than by wetting of the reactants.

6 Claims, 1 Drawing Figure

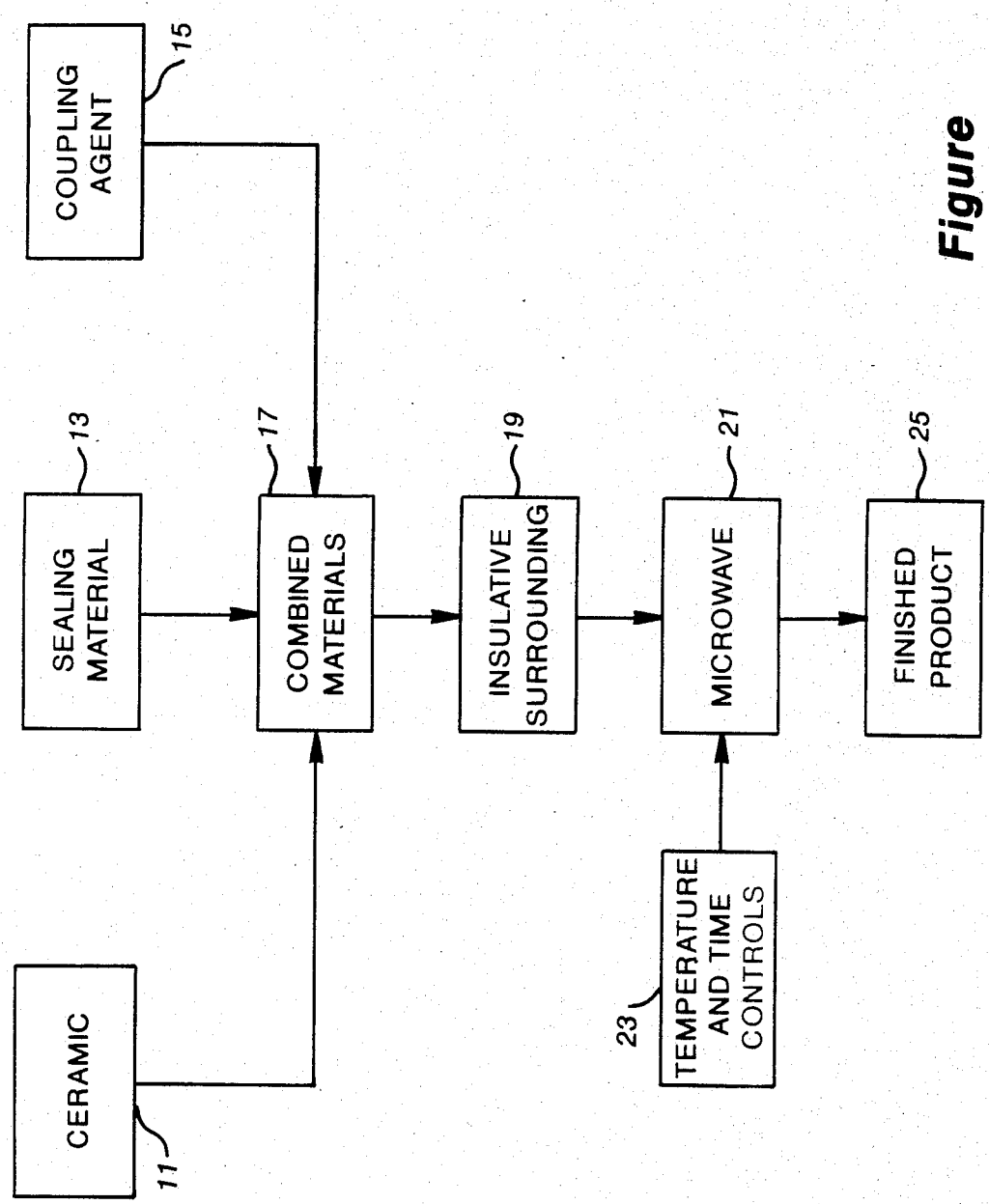
*Figure*

CERAMIC-GLASS-CERAMIC SEAL BY MICROWAVE HEATING

BACKGROUND OF THE INVENTION

The present invention relates generally to a method for forming a ceramic-glass-ceramic seal and more particularly for forming such a seal by microwave heating. This invention is the result of a contract with the Department of Energy (Contract No. W-7405-ENG-36).

Conventional sealing of ceramics is done using resistant heating furnaces consuming relatively high quantities of energy, time and manpower while subjecting the ceramics to rather hostile environments.

Therefore, it is an object of the present invention to provide an improved method of forming ceramic-glass-ceramic seals.

It is a further object of the present invention to provide an easily automated, low energy, efficient, fast, and effective method for forming ceramic-glass-ceramic seals.

SUMMARY OF THE INVENTION

To achieve the foregoing and other objects, and in accordance with the purpose of the present invention, as embodied and broadly described herein, the method of this invention may comprise mixing a small amount of a coupling agent with a sealing material to form a slurry, spreading the slurry evenly over a ceramic substrate, enclosing same with a similar substrate, placing the combination into an insulative reaction cavity, covering the cavity with insulative material, and microwave coupling through the insulative material for a time sufficient to form a ceramic to ceramic seal.

An advantage of the present invention is derived from the significant time and energy savings compared to conventional heating methods.

Another advantage of the present invention is that a different sealing microstructure is produced.

Still another advantage of the present invention is the reduced time necessary for cool down compared to conventional heating.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate the embodiment of the present invention and, together with the description, serve to explain the principles of the invention. In the drawings:

The FIGURE is a flow diagram illustrating the steps of the present invention.

DETAILED DESCRIPTION OF THE PREFERRED EMBODIMENT

The process and operation of the invention may be appreciated with reference to the FIGURE. First, the ceramic 11 to be sealed is chosen. For example, an alumina substrate may be selected to be sealed with another similar alumina substrate. Then an appropriate sealing material 13 is selected for the ceramic 11. The usual key consideration here is that the thermal coefficient of expansion of the sealing material 13 be compatible with the selected ceramic 11. For the above example, Owen-Illinois glass #01756C would be an appropriate selection. Then a suitable coupling agent 15 is selected. The purpose of the coupling agent 15 is to provide good coupling to microwave energy. Therefore the optimum coupling agent 15 to be chosen is dependent upon the frequency, power and duration of the microwave energy to be absorbed. The insulative material 19 may be for the example chosen above made of Zircar-Al-15. The insulative material 19 is chosen to provide good thermal insulation while being "invisible" to microwave energy to be absorbed by the coupling agent 15. Physically, the insulative material 19 is fashioned both to provide a small cavity to hold the combined materials 17 and to extend outward in all directions so as to fill the area of a microwave device 21 or oven that will provide microwaves. The combined materials 17 surrounded by the insulative material 19 is then placed in a microwave generating device 21. In practice the microwave device 21 may be as simple as a conventional microwave oven.

A temperature and time control selector 23 is programmed to energize the microwave device 21 so as to microwave heat the combined materials 17. To better illustrate the above method, a specific example will be given. In this example, the ceramics 11 to be sealed are two 3M 96% alumina substrates of dimensions 5.08 cm×5.08 cm×0.0635 cm. The sealing material 13 is Corning 01756C glass and the coupling agent 15 is watch oil. The above is combined and placed within an insulative material 19 of Zincar-Al-15 which in turn is placed within a microwave device 21 being a convention home-type microwave oven. The microwave device 21 is programmed to run at full power (about 700 watts) for 99 minutes. The produced ceramic-glass-ceramic seal is the finished product 25.

During the majority of the programmed run, the microwave energy is coupled to the organic material of the coupling agent 15 and to easily polarizable lead atoms present in the glass sealing material 13. As the watch oil slowly rises in temperature, it causes the glass to also rise in temperature by convective heat transfer from the microwave heated organic oil coupling agent 15. Eventually, the oil-glass combination reaches the decomposition temperature of the watch oil coupling agent 15 (about 320° C.) at which point glass liquid phase occurs thus initiating microwave coupling directly to the glass sealing material 13. Also at this temperature, higher frequency relaxation mechanisms predominate which couple to the microwave radiation. The glass sealing material 13 is then raised to a temperature that will sustain the highest temperature liquid phase reaction (in this case the phase formation of $ZnO-Al_2O_3$). This temperature is maintained until completed phase formation has occurred and there are no further reactants present to enter into chemical reaction. For the specific example under consideration the highest temperature to be achieved is in the range of 700°–800° C. This high temperature is maintained for about ten minutes during which time the glass sealing material 13 completely reacts with the alumina ceramic 11, forming an alumina-lead-boro-glass phase and an alumina-zinc oxide phase between the alumina substrates. These phases can be identified by using energy dispersive x-ray analysis (EDAX).

In the above example, the constituents of the Owen-Illinois Glass #1756C is $B_2O_3$(9.4 w/o), $SiO_2$(2.4), ZnO (14.4), and PbO (64.9). The microwave device 21 used can be a Litton Model 1521 operating at 2.45 g Hz. The coupling agent 15 is watch oil obtainable from W. F. Nye Inc. Insulative material 19 can be Zircar insulating board obtainable from Zircar Products Inc. Also Fiberfrax paper obtainable from Carborundum may be used as additional insulative material 19 if desired. It is important to note that the present microwave method provides a different ceramic-glass-ceramic seal than the seal produced by convention heating methods. In the above example there occurs a diffusion of the glass sealing material 13 into the ceramic 11. The reaction of the glass sealing material 13 forms a chemically different seal than that which would be formed by conventional heating because it is formed by diffusion rather than by wetting of the reactants.

Also, for the specific example considered above the seal formed requires about 16 times less energy than one formed by conventional heating. The time required is about 14 times less. Finally, in part for these reasons, the manpower requirement is much less.

The foregoing description of the preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of producing a ceramic-glass-ceramic seal comprising the steps of:
   mixing a slurry of glass sealing material and coupling agent, applying said slurry to a plurality of ceramic workpieces for sealing,
   surrounding said slurry and plurality of ceramic workpieces with an insulative material,
   microwaving said slurry and plurality of ceramic workpieces at a power, time and frequency sufficient to cause a liquid phase reaction in said slurry, and
   allowing said slurry and plurality of ceramic workpieces to cool, thereby securing a ceramic-glass-ceramic seal.

2. The method of claim 1 wherein said step of mixing comprises mixing a slurry of glass sealing material and organic coupling agent.

3. The method of claim 2 wherein said step of mixing comprises mixing a slurry of glass sealing material and water.

4. The method of claim 2 wherein said step of mixing comprises mixing a slurry of glass sealing material and oil.

5. The method of claim 4 wherein said step of mixing comprises mixing a slurry of glass sealing material and watch oil.

6. The method of claim 1 wherein said step of microwaving comprising microwaving at a frequency of about 2.5 g Hz.

* * * * *